R. C. HUPP.
AUTOMOBILE HOOD.
APPLICATION FILED OCT. 31, 1913.
1,104,802.
Patented July 28, 1914.
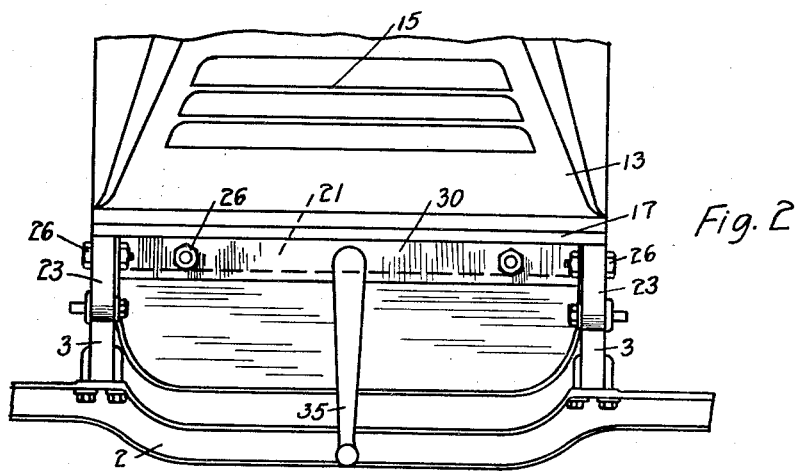
Fig. 2
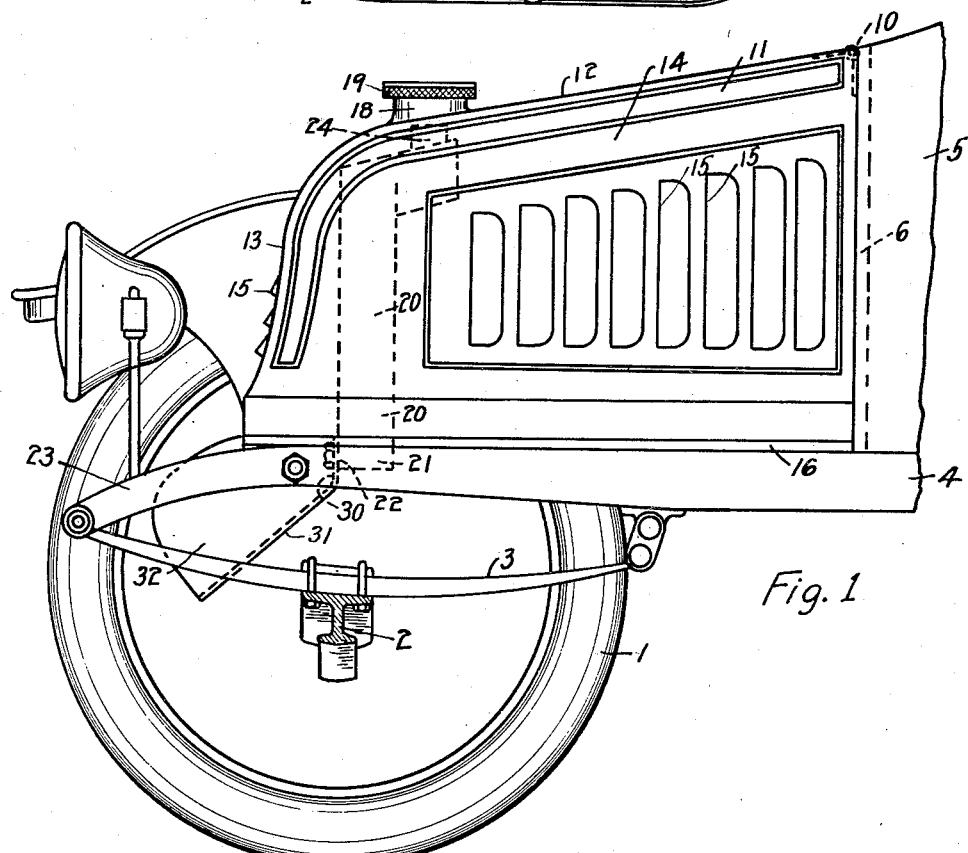
Fig. 1
Fig. 4
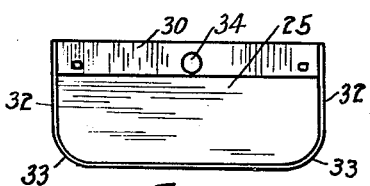
Fig. 3
WITNESSES:
H. W. Kreinbring.
M. A. Hawthorne.
INVENTOR
R. C. Hupp.
BY
Edward N. Pagelsen
ATTORNEY

UNITED STATES PATENT OFFICE.

ROBERT C. HUPP, OF DETROIT, MICHIGAN, ASSIGNOR TO ELSIE E. HUPP, OF DETROIT, MICHIGAN.

AUTOMOBILE-HOOD.

1,104,802.    Specification of Letters Patent.    Patented July 28, 1914.

Application filed October 31, 1913. Serial No. 798,426.

*To all whom it may concern:*

Be it known that I, ROBERT C. HUPP, a citizen of the United States, and a resident of Detroit, in the county of Wayne and State of Michigan, have invented a new and Improved Automobile-Hood, of which the following is a specifiation.

This invention relates to motor vehicles and its object is to provide a radiator inclosure wherein the radiator is easily accessible, and is protected from rain and mud, and in which provision is made for a positive circulation of air around and between the sections of the radiator.

It consists, in combination with the frame of a motor vehicle having a radiator located thereon and a radiator hood pivoted to swing vertically, said hood normally inclosing the radiator at its top, its front, and its sides, of a combined mud guard and air deflector whereby a positive circulation of air through the radiator is insured.

It further consists in the novel details of construction illustrated in the accompanying drawings and more specifically pointed out in the claims.

In the drawings, Figure 1 is a side view of the front end of a vehicle embodying my invention, the near wheel and ordinary mud guard being removed. Fig. 2 is a front view of a portion of the vehicle showing the relation of the combined dust guard and air deflector to the lower portion of the hood. Fig. 3 is a front view of the combined mud guard and dust deflector, and Fig. 4 is a side view thereof.

Similar characters of reference refer to like parts throughout the several views.

By means of the wheels 1, axle 2, and springs 3, the frame, comprising the usual side bars 4, and the body 5 of the vehicle are carried in the ordinary manner, the dash board being indicated at 6. Hinged to swing upwardly about pivots 10, (but one of which is shown,) that are preferably located near the upper edge of the dashboard, is a hood 11 comprising an open bottom, a top 12, a front 13 and sides 14, the front and sides of which may be provided with louvers 15. The hood when lowered, as shown, rests upon the filler plate 16 that extends along the top edges of the frame near the front end thereof, and across the front, as indicated at 17. The hood is also provided with a hollow upstanding cylindrical projection 18 that may be closed by a cap 19.

A radiator 20 of any suitable construction may be mounted in any desired manner upon a cross-piece 21 that is carried between the forward ends of the side-bars, and whose upper edge may coincide with the upper edge of the filler plate 16, as indicated in Fig. 1. The radiator may be provided with an ordinary capped filling pipe or member 24 that is arranged beneath the cap 19 on the hood. To the forward edge 22 of this cross-piece 21 and between the spring-outriggers 23, a scoop-shaped combined mud or dust guard and air deflector 25 is attached preferably by the bolts 26, the details of this member being best shown in Figs. 3 and 4. As indicated thereby, it consists of a vertical rear side 30 that engages with the front edge 22 of the cross-piece 21, a forwardly inclined combined bottom and rear portion 31, and the vertically extending sides 32 that may merge into the portion 31 along the curves 33. The member 25 has also formed therein an opening 34 through which the shaft of the starting crank 35 may project.

The hood 11 protects the radiator from rain or the like, and the combined air deflector and mud-guard 25, together with the ordinary bottom (not shown) for the space underneath the hood at the rear of the radiator, serves to prevent any splashing of mud or dust upon the radiator. The radiator consequently may be left unpainted, resulting in a higher rate of radiation per unit of radiator surface than is the case with painted radiators. The member 25 also directs the air upwardly into contact with the radiator after which it passes out through the sides of the hood in the usual manner.

The radiator may be filled by removing the cap 19 on the hood and pouring the liquid through the projection 18, and the filling pipe or member 24.

It is obvious that many changes may be made in the details of the construction without departing from the spirit of my invention; for example, the radiator, the hood and the member 25 may be located elsewhere in the vehicle than in the position shown, and the form of each of these parts may be changed.

Having now described my construction, what I claim as my invention and desire to secure by Letters Patent is:—

1. In a motor vehicle, a frame, a radiator mounted on the frame, a hood attached to the frame and inclosing the radiator at the top, sides and front down to the level of the bottom of the radiator so as to protect it from the weather, the bottom of the hood being open at its forward end, and an air deflector so arranged as to deflect air upwardly through the open bottom of the hood into contact with the radiator when the vehicle is running.

2. In a motor vehicle, a frame, a radiator mounted on the frame, a hood attached to the frame and inclosing the radiator at the top, sides and front down to the level of the bottom of the radiator so as to protect it from the weather, the bottom of the hood being open at its forward end, and a scoop-shaped air deflector secured to the frame, said deflector being adapted to deflect air upwardly through the open bottom of the hood into contact with the radiator when the vehicle is running.

3. In a motor vehicle, a frame, a radiator mounted on the frame, a pivot on the frame, a hood attached to the pivot so as to swing vertically thereon, the hood having a top, front and sides that inclose the radiator down to the level of the bottom thereof and protect it from the weather, the bottom of the hood being open at the forward end, and an air deflector arranged to deflect air upwardly through the open bottom of the hood into contact with the radiator when the vehicle is running.

4. In a motor vehicle, a frame comprising side bars and a cross-piece extending between the side bars, a radiator mounted on the cross-piece, a body on the frame, said body comprising a dash board, a pivot mounted on the dash board near its upper edge, a hood secured thereto and adapted to swing vertically thereon, said hood normally inclosing the radiator at the top, sides and front, the bottom of the hood being open forward of the radiator, and a member attached to the cross-piece and projecting downwardly and forwardly therefrom, said member being adapted to deflect air upwardly through the opening forward of the radiator into contact with the radiator and to prevent mud or dirt from splashing upwardly against the radiator when the vehicle is running.

5. In a motor vehicle, a frame comprising side bars and a cross-piece extending between the side bars, a radiator mounted on the cross-piece, a body on the frame, said body comprising a dash board, a pivot mounted on the dash board near its upper edge, a hood secured thereto and adapted to swing vertically thereon, said hood normally inclosing the radiator at the top, sides and front, the bottom of the hood being open forward of the radiator, and a scoop-shaped member attached to the cross-piece and projecting downwardly and forwardly therefrom, said member being adapted to deflect air upwardly into contact with the radiator and to prevent mud or dirt from splashing upwardly against the radiator when the vehicle is running.

6. In a motor vehicle, a frame, comprising a radiator support, a radiator mounted thereon, a hood having a top, front and sides inclosing the radiator so as to protect it from the weather, louvers in the front and sides of the hood, the bottom of the hood being open forward of the radiator, a member projecting downwardly and forwardly from the radiator support, said member being adapted to deflect air upwardly through the opening forward of the radiator into contact with the radiator and to prevent mud and dirt from being splashed on the radiator.

7. In a motor vehicle, a frame, a radiator supported thereon, said radiator having a filling opening therein, a body carried by the frame, said body comprising a dash board, a pivot near the upper edge of the dash board, a hood secured to the pivot and adapted to swing upwardly thereon, said hood comprising a front, sides and a top that normally inclose the radiator and protect it from the weather, and a capped opening in the top of the hood in proximity to the filling opening in the radiator, whereby the filling opening is rendered accessible.

In testimony whereof I have signed this specification in the presence of two subscribing witnesses.

ROBERT C. HUPP.

Witnesses:
ELSIE E. HUPP,
MARY G. WINN.